Dec. 15, 1942.　　　E. H. REHN　　　2,305,495
SHOCKER FOR CORN AND THE LIKE
Filed July 11, 1940　　　5 Sheets-Sheet 1

Inventor
Edward H. Rehn
By Staley & Welch
Attorneys

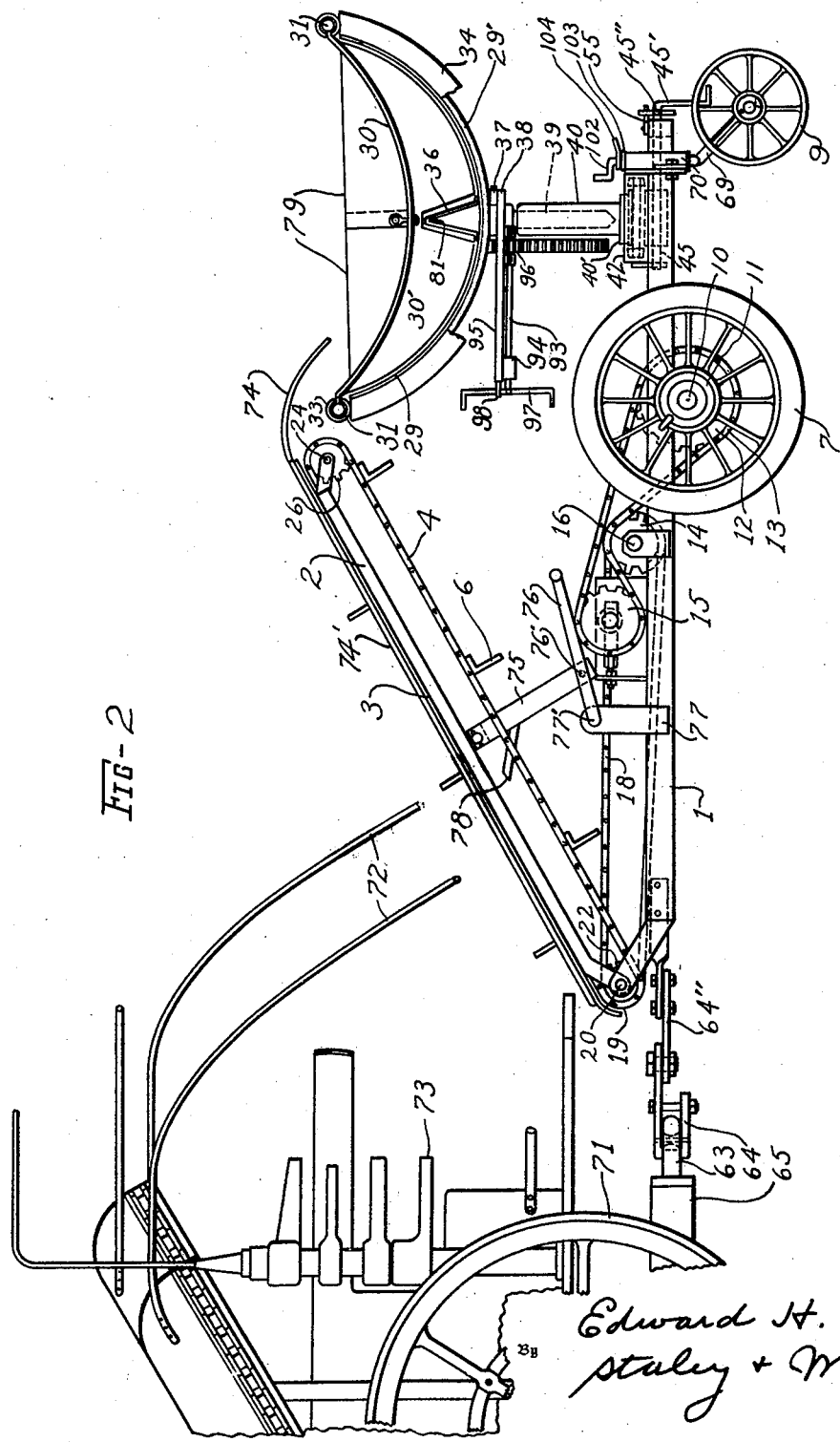

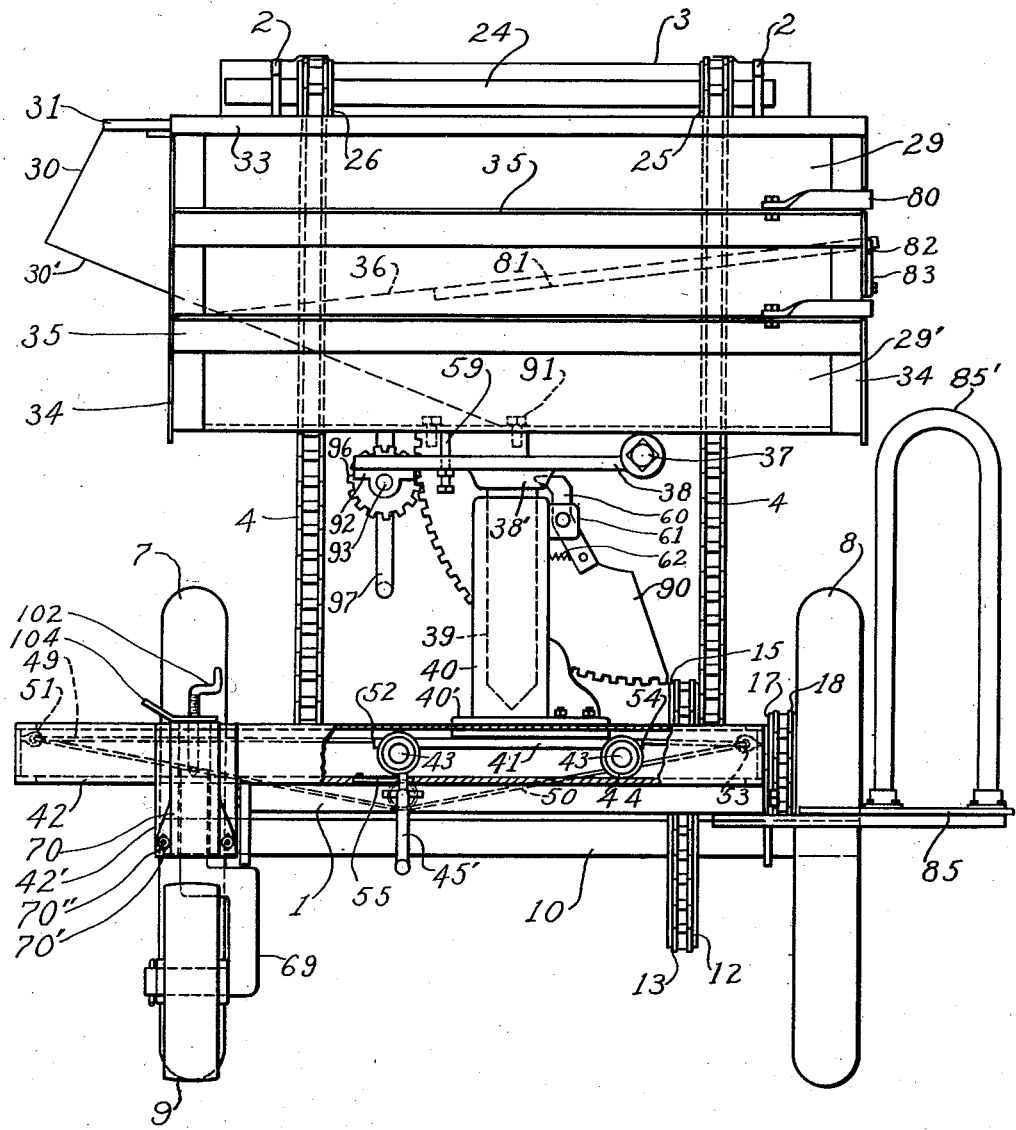

Dec. 15, 1942. E. H. REHN 2,305,495
SHOCKER FOR CORN AND THE LIKE
Filed July 11, 1940 5 Sheets-Sheet 4
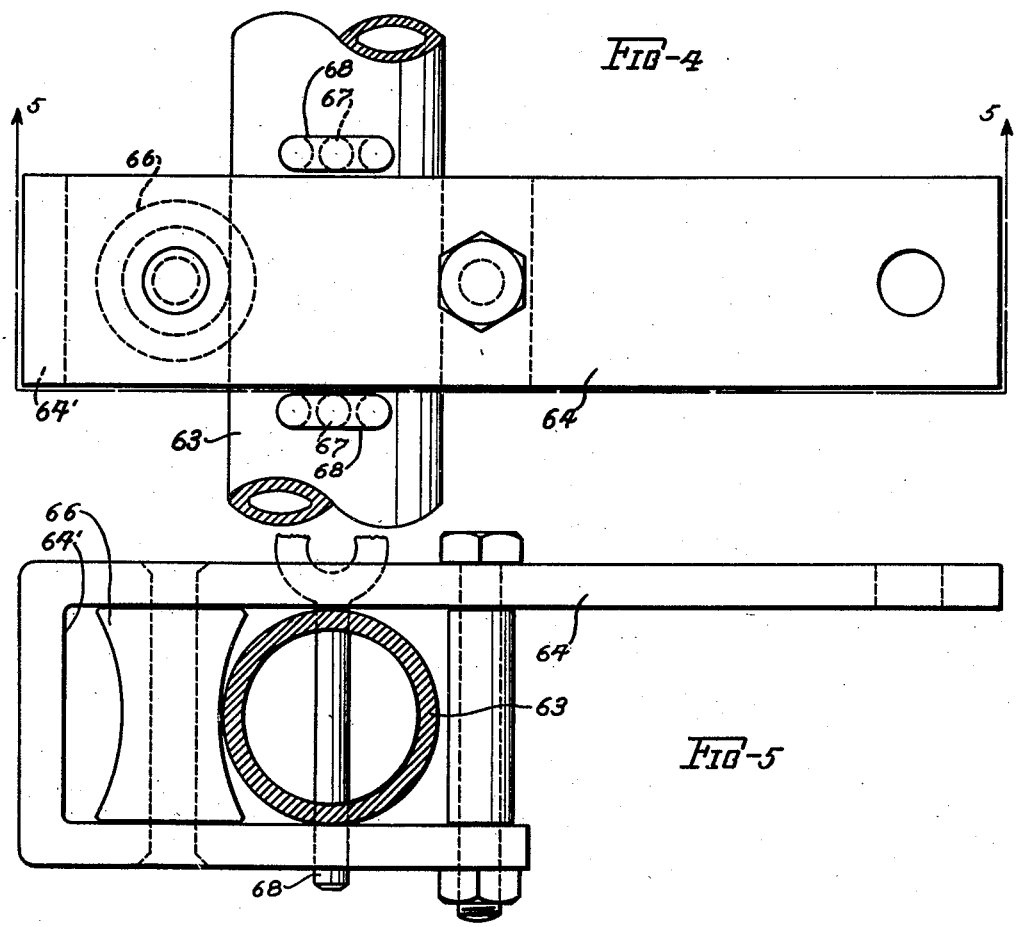
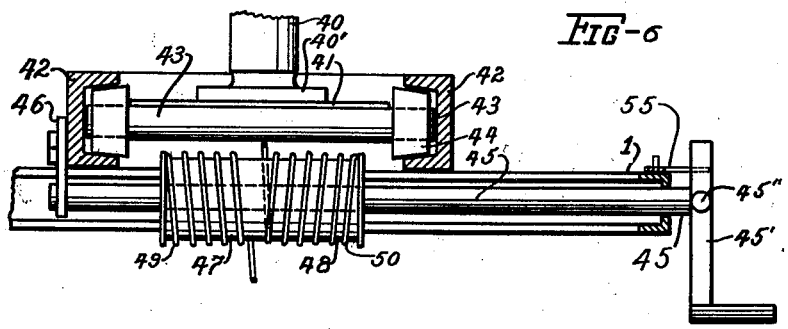
Inventor
Edward H. Rehn
By Staley + Melch
Attorney Dec. 15, 1942.  E. H. REHN  2,305,495
SHOCKER FOR CORN AND THE LIKE
Filed July 11, 1940  5 Sheets-Sheet 5
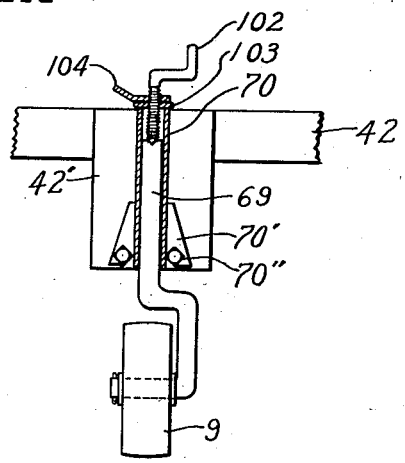
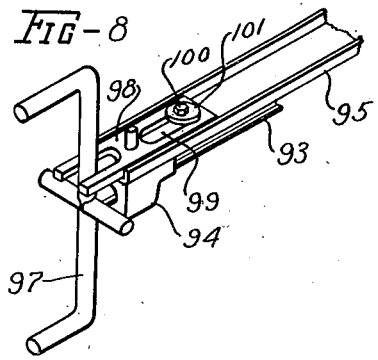
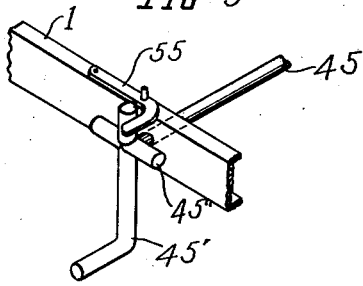
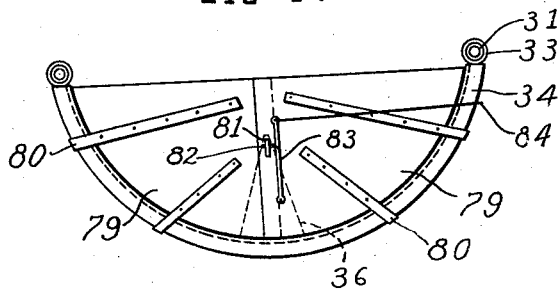
Inventor
Edward H. Rehn
By Staley & Wilch
Attorneys Patented Dec. 15, 1942

2,305,495

UNITED STATES PATENT OFFICE 2,305,495

SHOCKER FOR CORN AND THE LIKE

Edward H. Rehn, Lima, Ohio

Application July 11, 1940, Serial No. 344,939

8 Claims. (Cl. 56—401)

This invention relates to improvements in shockers for such material as ordinary field corn stalks, sweet corn stalks, sugar cane stalks, kaffir-corn stalks, bundled hay and other like products.

One of the objects of the invention is to provide an arrangement whereby tilting or teetering of the shocker frame is prevented to obviate strain on the hitch between the shocker frame and the binder for the products to be shocked in the event the shocker is attached to a binder.

A further object of the invention is to provide an arrangement for equalizing or compensating for the strain of draft in a shock-forming machine adapted to be coupled to a binder in which there is employed an elevator in connection with means for driving the conveyor of the elevator from one of the supporting wheels of the shock-forming machine.

A further object of the invention is to provide a hopper to receive the products so shaped as to conform to the contour of the products deposited therein.

A further object of the invention is to provide a hopper the length of which may be varied for different lengths of stalks or other products.

A further object of the invention is to provide for adjusting the hopper laterally with respect to the elevator with which it is associated in order to properly position the hopper with relation to the products such as corn stalks which are being carried thereto by the elevator with which it is associated.

A further object of the invention is to provide means at one end of the hopper whereby the butt end of stalks or similar material may be aligned as they are deposited in the hopper from the elevator; a further and more specific object in this connection being to provide hinged doors at one end of the hopper for this purpose, together with means for locking the doors.

A further object of the invention is to provide means whereby the hopper may be readily tilted with little effort in order to deposit the load of material upon the ground.

In the accompanying drawings:

Fig. 2 is a side elevation of the parts shown in Fig. 1, with a portion of the hopper broken away.

Fig. 3 is a rear elevation of the shocker, with some of the parts of the elevator omitted.

Fig. 4 is a plan view of a portion of the coupling device between the shocker and binder frames.

Fig. 5 is a section on the line 5—5 of Fig. 4.

Fig. 6 is a detail of a portion of the device for effecting the lateral adjustment of the hopper.

Fig. 7 is a vertical section of the caster wheel which supports the rear end of the shocker.

Fig. 8 is a perspective view of a portion of the device which tilts the hopper.

Fig. 9 is a perspective view of the lock for the handle which effects a lateral adjustment of the hopper.

Fig. 10 is an elevation of the discharge end of the hopper.

Figure 1:
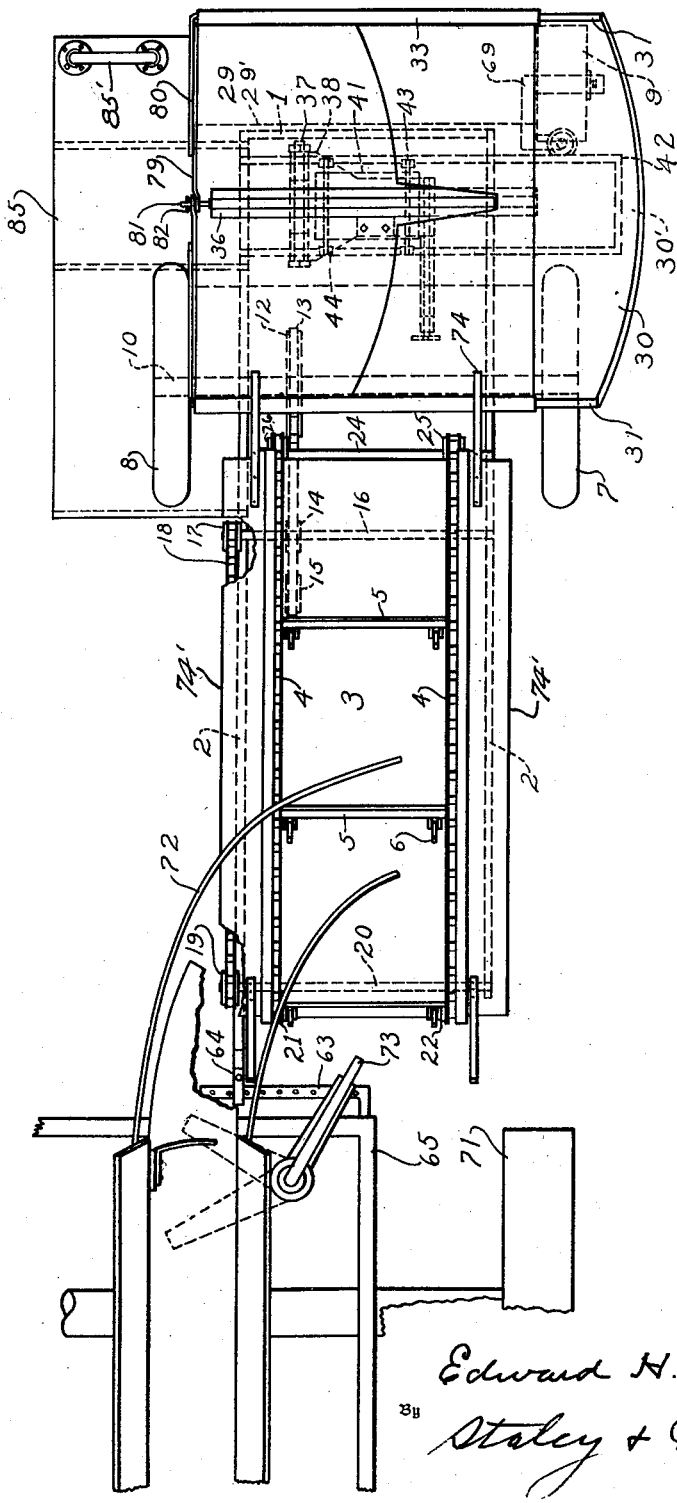
Fig. 1 is a top plan view of a shocker embodying the improvements shown coupled to the rear end of a binder.

Referring to the drawings, 1 represents the frame of the shocker, this frame being of channel construction as shown in Fig. 6. Mounted upon this frame is an elevator for the material to be shocked. This elevator has side bars 2 which support a sheet metal bottom 3 over which pass the endless sprocket chains 4 which are connected by the cross bars 5 which have pivoted fingers 6 which carry the material upwardly. The shocker frame is supported by two ground wheels 7 and 8 and also by a caster wheel 9, and the endless conveyor is driven in the present case from both ground wheels 7 and 8, although it may be driven from the ground wheel 8 alone if desired. Each of these ground wheels in the present case is connected to an axle 10 by a one-way clutch 11 of usual form, one of these clutches only being shown in the present case, it being the clutch connecting the wheel 7 with the axle although it is to be understood that the wheel 8 is connected to the axle in the same manner. The shaft 10 has secured thereto a sprocket wheel 12 over which passes a sprocket chain 13 which in turn passes over a sprocket wheel 14 and about a tightener sprocket 15 of usual form and thence back to the sprocket wheel 12. The sprocket wheel 14 is secured to a shaft 16 and on the same shaft is a sprocket wheel 17. Passing about the sprocket wheel 17 is the sprocket chain 18 which extends about a sprocket wheel 19 and thence back to the sprocket wheel 17. The sprocket wheel 19 is fast to one end of the shaft 20 and the shaft 20 has fast thereto a pair of sprocket wheels 21, about which pass the chains of the elevator. A transverse shaft 24 is journalled in the side bars 2 and this shaft 24 has sprocket wheels 25 and 26 over which pass the endless sprocket chains 4. By this arrangement the endless conveyor of the elevator when the machine is in operation is moved to convey the material from any suitable source such as a binder to a suitable point of discharge such as the hopper now to be described.

The hopper in the present case consists of a transversely arranged semi-cylindrical sheet metal main portion 29 and an auxiliary member 30 of less length than the main portion 29 which part when bent to form provides a hopper which has one portion thereof at a higher elevation than the other portion. The side edges of this auxiliary hopper which is in the nature of a riser have attached thereto tubular members 31 which telescope within tubular members 33 attached to the side edges of the main hopper portion 29. As shown best in Fig. 3 the bottom 30' of the auxiliary hopper portion extends from the bottom of the main hopper 29 to a point substantially midway the height thereof. The purpose of this auxiliary portion is to provide a better support for such material as corn stalks which are placed in the hopper with the butt portions thereof at one end of the main hopper 29 and the tassel portion resting upon the elevated bottom 30' of the auxiliary hopper so as to give to the stalks which are fed into the hopper substantially the shape of a shock of corn or other similar material. By reason of the slidable tubular members 31 which are telescopically received in the tubular members 33 the auxiliary hopper portion 30 may be adjusted with relation to the main hopper portion so as to increase or diminish the length of the hopper proper to accommodate different sized stalks, this arrangement being made according to the field of corn or other product which is to be shocked.

The main hopper has secured to each end thereof a semi-circular angle iron 34 and these angle irons are connected by angle iron bars 35 which extend on each side of the hopper. Extending longitudinally of the hopper is a centrally positioned inverted V-shaped member 36 which is for the purpose of leaving an opening in the shock after the formation thereof to provide for circulation of the air through the shock after it has been dumped on the ground.

The hopper 29 in the present case is rotatably mounted upon the frame of the shocker. The main hopper portion 29 has a stiffening plate 29' welded thereon, which covers a substantial portion of the hopper bottom as shown in Figs. 2 and 3. The reenforcing plate 29' of the hopper is hinged to a plate 38 by the hinge pin 37, which passes through ears arranged respectively on the two plates. This hinge plate 38 has a stem 39 which is swivelled in a standard 40 which is supported by a carriage 41, the lower end of the standard having a flanged face 40' which is secured in any suitable way to the carriage 41. The carriage 41 in turn is slidably mounted upon an auxiliary frame consisting of a pair of channel-shaped members 42 supported from the main frame of the shocker, the carriage having a pair of shafts 43 each having a pair of rollers 44 which run in the channels 42.

Provision is made for adjusting the carriage and hence the hopper by the mechanism shown in detail in Fig. 6. A shaft 45 is journalled at one end in the main frame 1 and at the other end in a plate 46 which is bolted to one of the channel members 42. This shaft has a crank arm 45' and also has a pair of drums 47 and 48 fast thereto about which are passed in a reverse direction cables 49 and 50. One of these cables 49 passes through an eyelet 51 and has its end fastened to the carriage 41 as at 52. The other cable 50 passes through an eyelet 53 which is fastened to the carriage as at 54. As a result of this arrangement when the shaft 45 is turned by its crank in one direction one of these cables will be wound and the other unwound thus moving the carriage in one direction and when the shaft is moved in the opposite direction the carriage will in like manner be moved in the opposite direction.

To prevent the shaft from turning, there is provided a latch 55 pivoted to the frame member 1 and the crank 45 is provided with two oppositely-extending projections 45''. When the latch is thrown from the position in Fig. 9 it will be seen that it prevents rotation of the crank arm, four different locking positions being provided for each revolution of the shaft 45.

An adjusting bolt 59 is carried by the free end of the plate 38 so as to hold the hopper and plate 38 in proper alignment. The hopper is prevented from moving in a circular path by a catch 60 which is pivoted to an ear 61 on the standard 40 with its nose engaging in a recess in the boss 38' on the under side of the plate 38, a spring 62 normally holding the catch 60 in engagement with the boss. When it is desired to discharge the load of material from the hopper the catch 60 is released so that the hopper may be moved in a circular path to any desired degree. To that end the hopper is provided with a curved rack 90, the upper end of this rack being secured to the reenforcing plate 29' of the hopper by bolts 91. Secured to the end of the plate 38 is a bearing 92 for a shaft 93, the other end of the shaft being journalled in a bearing 94 secured to a channel-shaped member 95 which is welded to the plate 38 and projects therefrom. One end of this shaft carries a pinion 96 in mesh with the rack 90 and the other end of the shaft is provided with a handle 97 by which the shaft may be manually rotated for the purpose of tilting the hopper. For the purpose of holding the shaft against rotation the handle 97 is adapted to be engaged by a latch 98 which is slidably mounted in the channel-shaped support 95 (Fig. 8 for detail). This latch 98 has a forked end to engage the handle and also has a slot 99 through which passes a bolt 100 which has a threaded engagement with the support 95, a washer 101 being interposed between the latch and the head of the bolt.

The coupling which hitches the shocker and binder frames together is shown in detail in Figs. 4 and 5. This coupling consists of a transversely arranged tubular bar 63 and a clevis 64. The bar 63 is rigidly attached to the rear end of the frame 65 of the binder and extends transversely of the binder while the clevis 64 is rigidly attached to the frame 1 of the shocker by the connection 64''. One end of the clevis is U-shaped as indicated at 64' which loosely straddles the bar 63 and this U-shaped portion has journalled therein a grooved roller 66 which rocks upon the bar 63. This allows for relative vertical movement between the binder and shocker frame, the clevis 64 rocking upon the bar 63 during this movement. The bar 63 has a series of openings 67 spaced apart a little more than the width of the clevis and those openings receive pins 68 one of which is placed upon each side of the clevis in normal operation to hold the clevis in different positions of adjustment. The fact that the pins will be spaced apart slightly more than the width of the clevis allows for normal turning movement between the binder and shocker frames. Ordinarily no interference between the frames of the shocker and binder is had in making a right turn but if a left turn is to be made the left hand pin is removed so that the clevis may have a free movement on the bar 63 to provide proper clearance between the two frames, the roller in this case rolling upon the bar 63.

It will be noted from the plan view in Fig. 1 that the normal connection of the clevis 64 with the bar 63 is substantially at the center of the draft line of the binder. To eliminate side draft it is found desirable to drive the elevator conveyor solely by the wheel 8, the other wheel being disconnected from the axle by disengaging the clutch 11. This brings the point of draft between the coupling members substantially on a line midway between the power exerted by the draft wheel 8 and the power exerted by the sprocket wheel 12 thus substantially equalizing the draft between the binder and shocker frames, eliminating side draft.

In order to relieve the coupling between the shocker and binder frames of undue strain by preventing tilting or teetering of the shocker frame, the caster wheel 9 heretofore referred to is provided. This caster wheel has a stem 69 which is journalled in a bearing 70, the bearing being bolted to a plate 42' which plate is welded to the member 42. For the purpose of securing the bearing to the plate the bearing is provided with a pair of wings 70' to receive the bolts 70''. In order to raise and lower the rear end of the frame of the shocker, there is provided an adjusting screw 102 which has a threaded connection with a bushing 103, with its lower end adapted to bear upon the upper end of the stem 69 of the caster wheel. A lock nut 104 is preferably provided to hold the screw 102 in different positions of adjustment. This caster wheel is arranged to travel in the same path as that of the ground wheel 7 and the carrying wheel 71 of the binder so that all three of these wheels will run between rows of cut stalks.

The cut stalks of corn or other product are delivered to the conveyor of the elevator by the curved tines 72, being delivered to these tines by the usual ejector fingers 73, and at the upper end of the elevator are curved tines 74 to guide the material to the hopper. These tines are secured in any suitable way to the upper ends of guiding or supporting strips 74' for the stalks of corn or other material being elevated so that the material will be forced by the fingers 6 over the tines and deposited in the hopper; the strips 74' being secured to and supported by the side bars 2.

When the hopper is swung to discharging position it is sometimes necessary to provide a proper clearance between the discharge end of the elevator and the material in the hopper or the hopper itself. In the present case provision is made for elevating the discharge end of the elevator and to that end the frame of the elevator has pivotally secured thereto a strap 75 to one end of which is pivotally connected a lever 76 which in turn is pivotally connected to a standard 77 projecting upwardly from the main frame 1 of the shocker. When the elevator is raised the pivotal point 76' between the strap 75 and the lever 76 is thrown past the center line between the pivotal point 77' and the point of connection of the strap with the elevator and a stop 78 connected with the strap 75 being provided to prevent the parts from going too far off the center line, the strap 78 engaging with the elevator frame.

While in the present instance the shocker has been shown coupled to a binder and the material to be shocked delivered from the binder it is to be understood that the shocker may be used separately from the binder and the material to be shocked placed upon the conveyor of the elevator in any suitable manner.

At one end of the hopper is a pair of hinged doors 79, the purpose of the doors when locked in closed position being to align the butt ends of the stalks. Each door has a pair of straps 80 which are bent about the end ring 34, as shown in Figs. 3 and 10, and are hinged to the hopper member 35. To lock the door a bar 81 is secured in the apex of the member 36 and has its outer end projecting through apertures in the doors. The bar 81 has an aperture which receives a pin 82 on a pivoted latch 83 which may be released by a rope or cable 84.

Carried by the main frame 1 of the shocker is an operator's platform 85 so that the operator may stand in a position to see that the butts of the stalks are properly positioned against the doors. A guard 85' is carried by the rear end of the platform in the nature of an inverted U-shaped standard which may be grasped by the operator to steady himself.

Having thus described my invention, I claim:

1. In a shocker, a hopper to receive material to be shocked, said hopper consisting of a main portion and an auxiliary portion located within the main portion and of less length than the main portion, said auxiliary portion being of greater elevation than the main portion when the hopper is in untilted position.

2. In a shocker, a hopper to receive the material to be shocked, said hopper consisting of a main portion and an auxiliary portion of less length than the main portion and located within the main portion, said auxiliary portion being of greater elevation than the main portion when the hopper is in untilted position, and means to adjust said auxiliary portion lengthwise of said main portion.

3. In a shocker, a hopper to receive material to be shocked, said hopper consisting of a transversely extending semi-cylindrical main portion and an auxiliary portion located within the main portion and of less length than said main portion and of greater elevation than the main portion when the hopper is in untilted position, and tubular telescopic members secured to the adjacent edges of said main hopper portion and said auxiliary hopper portion, the members on said auxiliary hopper being slidable with the other members to adjust the length of the hopper.

4. In a shocker, a hopper to receive material to be shocked, a carriage upon which said hopper is mounted, a support for said carriage consisting of spaced parallel channel members, rollers carried by said carriage adapted to run in said channel members, and means for moving said carriage on said support, said means consisting of a shaft, a pair of drums fast to said shaft, a flexible cable wound on each of said drums, said cables being reversely wound with relation to each other, the free end of said cables being connected with opposite ends of said carriage, means about which said cables run.

5. In a shocker, a main frame, a hopper mounted on said frame, an elevator mounted on said frame discharging into said hopper, a pair of parallel carrying wheels for said frame, a caster wheel also forming a support for said frame and disposed in a different transverse plane from said carrying wheels and at one side of said frame.

6. In a shocker, a main frame, a hopper mounted on said frame, an elevator mounted on said frame discharging into said hopper, a pair of parallel carrying wheels for said frame, a caster wheel also forming a support for said frame and disposed in a different transverse plane from said carrying wheels and at one side of said frame, said caster wheel being arranged to follow in the path of one of said carrying wheels.

7. In a shocker adapted to be attached to a binder, a main frame, an elevator carried by said frame, a hopper also carried by said frame to receive the discharge from said elevator, a pair of parallel carrying wheels for said frame, a caster wheel acting as a support for said frame, said caster wheel being arranged in a different transverse plane from said carrying wheels and adapted to follow in the path of one of said carrying wheels and said carrying wheel and caster wheel following in the path of one of the binder ground wheels.

8. The combination of a shock-forming machine and the frame of a binder, coupling means for coupling the shock-forming machine to the binder frame comprising a member attached to the shock-forming machine, an elevator having an endless conveyor forming a part of the shock-forming machine, means for driving the conveyor comprising a transverse shaft, a carrying wheel for driving the shaft and a sprocket wheel on said shaft but removed from the carrying wheel, the normal point of connection between the coupling members being substantially on a line between the points of power of said carrying wheel and said sprocket wheel.

EDWARD H. REHN.